United States Patent
Larkner et al.

(10) Patent No.: US 6,432,300 B2
(45) Date of Patent: *Aug. 13, 2002

(54) WATER PURIFICATION SYSTEM AND METHOD INCLUDING DISPENSED VOLUME SENSING AND CONTROL

(75) Inventors: Thomas J. Larkner; Steven C. Peake, both of Dubuque; Chester E. Chomka, Bellevue; Joseph F. Tilp, Dubuque; Eric J. Willman, Dubuque; Kerry W. Leppert, Dubuque; Tina M. Timmerman, Dubuque, all of IA (US)

(73) Assignee: Barnstead Thermolyn Corporation, Dubuque, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/923,212

(22) Filed: Aug. 6, 2001

Related U.S. Application Data

(63) Continuation of application No. 09/520,827, filed on Mar. 8, 2000, now Pat. No. 6,328,881.

(51) Int. Cl.[7] ............................................... B01D 17/12
(52) U.S. Cl. ........................ 210/87; 210/94; 210/109; 222/23; 222/189.06
(58) Field of Search .............................. 210/87, 94, 97, 210/100, 258, 416.1; 222/23, 36, 52, 189.06, 251; 219/85, 93, 138

(56) References Cited

U.S. PATENT DOCUMENTS

| | | |
|---|---|---|
| 4,780,200 A | 10/1988 | Bond et al. |
| 5,232,582 A | 8/1993 | Takahashi et al. |
| 5,334,497 A | 8/1994 | Inaba et al. |
| 5,397,468 A | 3/1995 | Chomka et al. |
| 5,399,263 A | 3/1995 | Chomka et al. |
| 5,540,107 A | 7/1996 | Silverman et al. |
| 5,614,088 A | 3/1997 | Nagai et al. |
| 5,635,059 A | 6/1997 | Johnson |

(List continued on next page.)

FOREIGN PATENT DOCUMENTS

| | | |
|---|---|---|
| EP | 0 947 231 A1 | 10/1999 |
| WO | WO 99/18040 | 4/1999 |
| WO | WO 99/65832 | 12/1999 |

OTHER PUBLICATIONS

European Search Report, dated Jun. 5, 2001.

Primary Examiner—Joseph W. Drodge
(74) Attorney, Agent, or Firm—Wood, Herron & Evans, LLP

(57) ABSTRACT

A water purification system for purifying water flowing through a water flow path. The system includes a water purification device having an inlet and an outlet in the water flow path and at least one interior volume communicating with the inlet and outlet. A purification medium is disposed within the interior volume of the water purification device. A flow control system is provided controlling a volume of purified water dispensed from the outlet. The flow control system includes an input device configured to allow a user to input a desired volume of purified water to be dispensed from the outlet and a sensing device coupled with the electronic input device and operative to determine the volume of purified water being dispensed from the outlet. A flow regulation device is coupled with the flow control system and operative to stop the discharge of purified water at the outlet upon reaching the desired volume of purified water.

4 Claims, 5 Drawing Sheets

U.S. PATENT DOCUMENTS

| | | |
|---|---|---|
| 5,685,994 A | 11/1997 | Johnson |
| 5,725,758 A | 3/1998 | Chace et al. |
| 5,785,864 A | 7/1998 | Teran et al. |
| 5,798,040 A | 8/1998 | Liang |
| 5,865,991 A | 2/1999 | Hsu |
| 5,876,610 A | 3/1999 | Clack et al. |
| 5,895,565 A | 4/1999 | Steininger et al. |
| 5,895,570 A | 4/1999 | Liang |
| 5,911,884 A * | 6/1999 | Boulter .................. 210/87 |
| 5,919,357 A | 7/1999 | Wilkins et al. |
| 5,925,240 A | 7/1999 | Wilkins et al. |
| 5,928,503 A | 7/1999 | Shang-Chun |
| 5,935,426 A | 8/1999 | Giordano et al. |
| 5,935,441 A | 8/1999 | O'Neill et al. |
| 6,090,294 A | 7/2000 | Teran et al. |
| 6,120,689 A | 9/2000 | Tonelli et al. |
| 6,126,834 A | 10/2000 | Tonelli et al. |
| 6,132,599 A | 10/2000 | Chaffee |
| 6,136,204 A | 10/2000 | Krejci |
| 6,149,824 A | 11/2000 | Chace et al. |
| 6,171,367 B1 | 1/2001 | Peng et al. |
| 6,312,589 B1 * | 11/2001 | Jarocki et al. ............ 210/87 |
| 6,328,881 B1 * | 12/2001 | Larkner et al. ............ 210/87 |

* cited by examiner

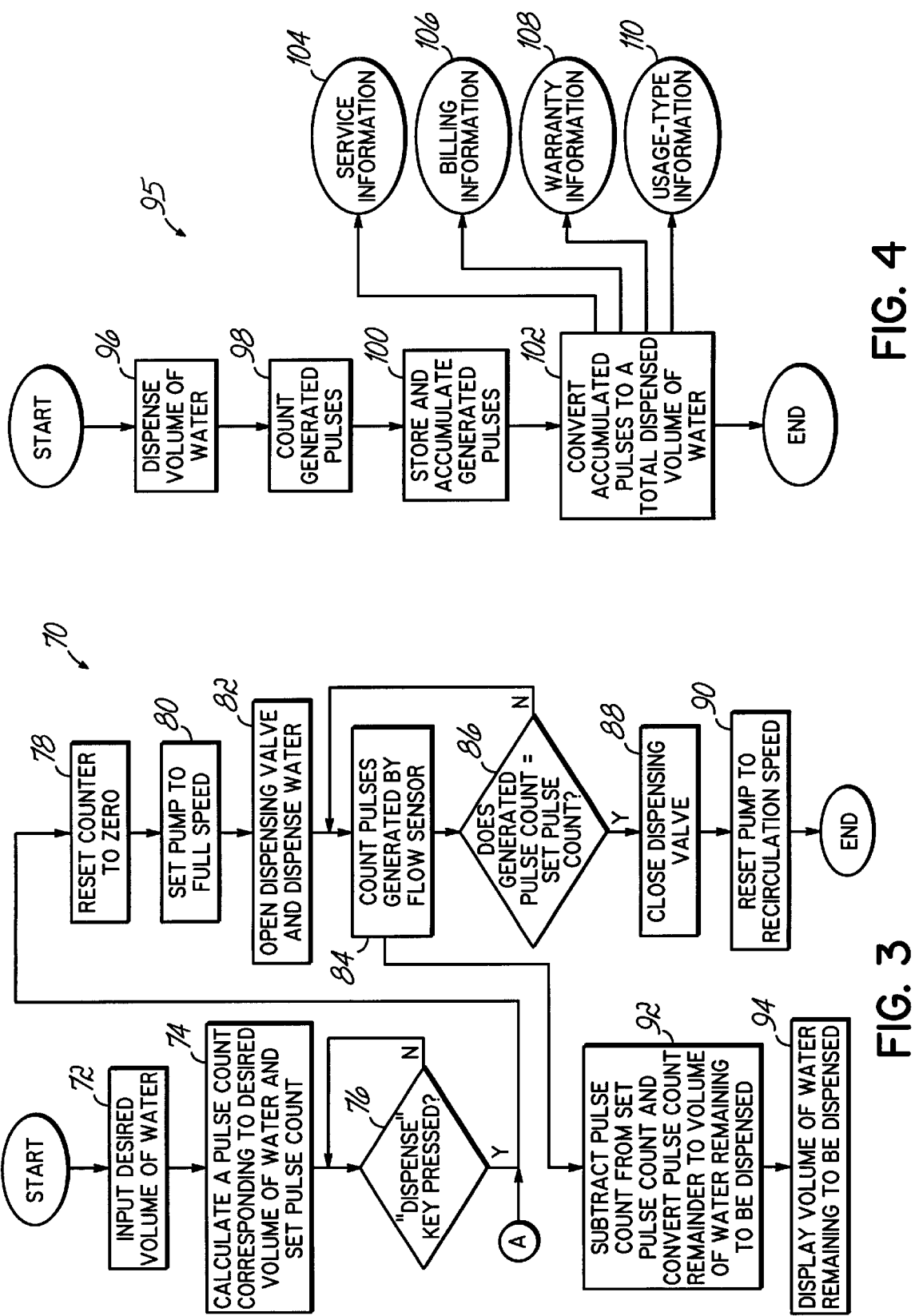

WATER PURIFICATION SYSTEM AND METHOD INCLUDING DISPENSED VOLUME SENSING AND CONTROL

The present application is a continuation of U.S. Ser. No. 09/520,827 filed Mar. 8, 2000, now U.S. Pat. No. 6,328,881, the disclosure of which is hereby incorporated by reference herein in its entirety.

FIELD OF THE INVENTION

The present invention generally relates to water purification systems and methods and, more specifically, to control systems used to sense and control a volumetric amount of water dispensed from the system.

BACKGROUND OF THE INVENTION

Water purification systems are used to provide high quality reagent grade water for various applications, including the field of scientific testing and analysis. Many of these applications require that the total organic carbon content of the water be on the order of 10 parts per billion or less ASTM. Type I water is the highest purity and is used for high performance liquid chromography, atomic absorption spectrometry, tissue culture, etc. Type II water is less pure and may be used for hematological, serological, and microbiological procedures. Type III water is suitable for general laboratory qualitative analyses, such as urinalysis, parasitology and histological procedures. Two prior systems for purifying water are disclosed in U.S. Pat. Nos. 5,397,468 and 5,399,263, each assigned to the assignee of the present invention. The disclosure of each of these patents is hereby incorporated by reference herein.

Purified water dispensing systems that currently provide automatic controlled dispensing of water do so using a timed dispense technique. This is accomplished by electronically controlling a solenoid valve and holding the solenoid valve open for a user-programmed time period. The user sets this time based on the amount of water they wish to dispense from the system. The user determines a relationship between dispensing time and flow rate for their specific system and operating conditions. Another method of controlling the dispensed amount of purified water involves manually opening a valve with the system pump shut off. Actuation of a switch in the valve initiates the pump when the valve is open. The pump remains energized for a time programmed by the user. When the time has expired, the pump is turned off by the control system. The manual valve remains open until the user returns to the system to close this valve. One significant drawback to this method is that the manual valve may remain open for some time until the user returns to shut it off. The main reason for using this method is to provide a manner of dispensing water into a larger vessel without holding a remote operating valve open for a long period of time and without running the water out of the vessel. Another drawback to both of these prior methods relates to the accuracy of the volume dispensed when relying on a user-defined relationship between dispensing time and dispensed volume. If the time value entered by the user is too long, the vessel being filled may run over. Generally, if the time value is incorrect by being either too long or too short, the user must manually correct the dispensed amount of water by removing water from the vessel or manually filling the vessel to the required amount. This, of course, defeats the purpose of having an automatic dispense control. The relationship between dispensed volume and dispensing time will also vary for any given system, depending on the pressure at the inlet of the system, the voltage on any pump associated with the system, the condition of the filters and membranes, among other factors.

In light of these and other problems in the art, it would be desirable to provide a water purification system having an accurate and automatic manner of sensing and, preferably, controlling the volume of water discharged from the system.

SUMMARY OF THE INVENTION

The present invention, in one aspect, provides a water purification system for purifying water flowing through a water flow path, and having a sensing device coupled with an electronic control for accurately indicating the volume of water dispensed from an outlet of the system. More specifically, the system includes a water purification device having an inlet and an outlet in the water flow path and at least one interior volume communicating with the inlet and outlet. A purification medium is positioned within the interior volume of the water purification device. The sensing device operates to generate a signal that is used to determine a volume of water dispensed from the outlet. The electronic control is coupled with the sensing device and includes an output responsive to the signal generated by the sensing device for indicating the volume of water dispensed from the outlet. The sensing device may comprise a flow sensor or, for example, a timer. The flow sensor may be coupled upstream of the inlet or downstream of the inlet, or at any other suitable location in the water flow path. The upstream position is preferred so that any contaminates from the sensor will be filtered out or purified by the purification device. If the sensing device is a timer, the timer is associated with a look-up table in the electronic control having time values usable to determine an amount of time for dispensing a desired volume of purified water from the outlet. Alternatively, the control may include an algorithm which is used in conjunction with the timer for dispensing the desired volume of purified water from the outlet. The control may further include an alerting device configured to alert the user when the desired volume of purified water has been dispensed from the outlet.

In the preferred embodiment, the control system includes an input device configured to allow a user to input a desired volume of purified water to be dispensed from the outlet. A flow regulation device is coupled with the control system and operative to stop the discharge of purified water at the outlet upon reaching the desired volume of purified water.

Various objectives, advantages and features of the invention will become more readily apparent to those of ordinary skill in the art upon review of the following detailed description of the preferred embodiments, taken in conjunction with the accompanying drawings.

BRIEF DESCRIPTION OF THE DRAWINGS

FIG. 3 is a software flow diagram of the "AUTOMATIC DISPENSE ROUTINE" performed by the flow control system of the present invention;

FIG. 4 is a software flow diagram of the "TOTAL VOLUME DISPENSED ROUTINE" performed by the flow control system of the present invention;

DETAILED DESCRIPTION OF THE PREFERRED EMBODIMENTS

Figure 1:
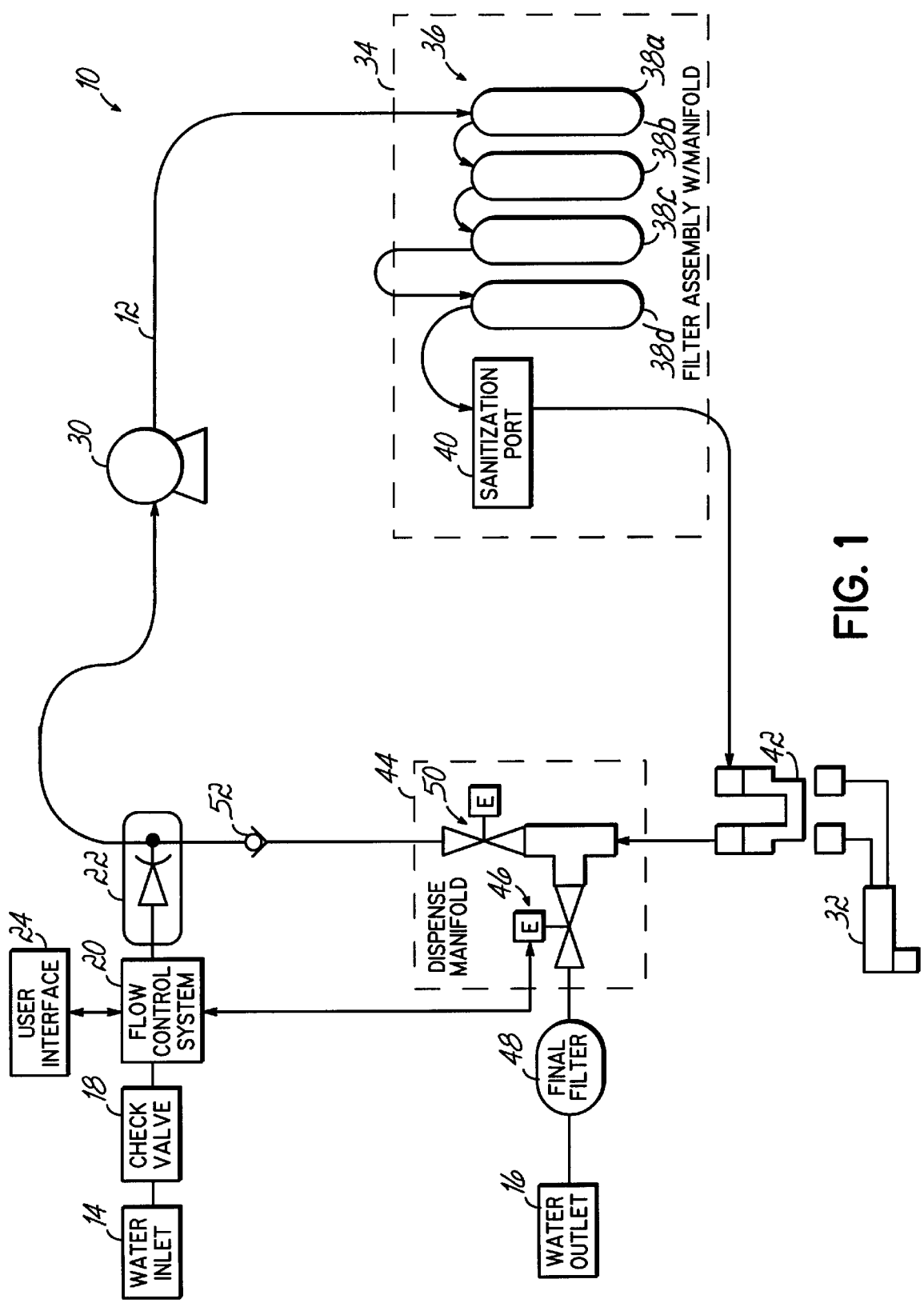
FIG. 1 is a schematic illustration of a water purifying system in accordance with the principles of the present invention.

With reference to the drawings, and to FIG. 1 in particular, a water purification system 10 is illustrated in accordance to the principles of the present invention for dispensing a controlled volume of purified water as desired by a user. Water purification system 10 includes a fluid circuit or water flow path 12 having a water inlet 14 connected to a source of water (not shown), and a water outlet 16 for dispensing the controlled volume of water that has been purified by the system. As will be described in greater detail below, the fluid circuit 12 is preferably designed so that the volume of water entering inlet 14 corresponds to the volume of purified water dispensed at the outlet 16. When purified water is not being dispensed at the outlet 16, the fluid circuit 12 is preferably designed to recirculate the water through the circuit 12.

Further referring to FIG. 1, water enters the inlet 14 of the fluid circuit 12 through a check valve 18, a flow control system 20 and a pressure regulator 22. As will be described in greater detail below, flow control system 20 is provided to allow a user to input a desired volume of water to be dispensed at the outlet 16, and also to determine the volume of water dispensed from the water purification system 10. A user interface 24, including a user input 26 (FIG. 2) and user display 28 (FIG. 2), is coupled to the flow control system 20 for receiving user inputs as well as providing a display of information to the user. Pressure regulator 22 is provided to limit or regulate the pressure within the fluid circuit 12 to a predetermined value, such as 15 psi. A pump 30 is preferably connected in the fluid circuit 12 to circulate the water into through the circuit 12. Pump 30 preferably has at least two operating speeds so that when purified water is not being dispensed from the system 10, the pump 30 is set to operate at a predetermined "recirculation speed". The speed of pump 30 is preferably increased to a predetermined "full speed" when purified water is being dispensed through the outlet 16 or through an optional remote dispensing gun 32 connected to the fluid circuit 12 as described in detail below. Alternatively, the pump 30 may have only a single operating speed, or the pump 30 may be eliminated and fluid circuit 12 may simply receive pressurized water through pressure regulator 22.

As illustrated in FIG. 1, the water purification system 10 includes a water purification device 34 having an inlet and an outlet connected in the fluid circuit 12 and in fluid communication with at least one interior volume of the device 34. The water purification device 34 is more fully disclosed in co-pending application U.S. Ser. No. 09/520,529, filed on Mar. 8, 2000, and hereby fully incorporated herein by reference.

Briefly, water purification device 34 comprises a filter assembly 36 including a plurality of identically constructed cartridges 38a–d coupled in fluid communication with each other and with the inlet and outlet of the water purification device 34. In operation, water circulating or passing through the fluid circuit 12 is directed through the filter assembly 36 or cartridges 38a–d as schematically illustrated in FIG. 1. Purified water exiting from cartridge 38d moves past a sanitization port 40 which may be used to periodically inject a sanitent into fluid circuit 12 as necessitated by application requirements. A jumper 42 is provided for optionally connecting the remote dispensing gun 32 to the fluid circuit 12 as described in detail below.

Upon exiting the filter assembly 36, the purified water enters a dispense manifold 44 connected in the fluid circuit 12. The dispenser manifold 44 includes a first normally-closed solenoid valve 46 that is coupled to the flow control system 20. The normally-closed solenoid valve 46 may be selectively opened by the user to direct water through a final filter 48 and through the water outlet 16. When purified water is not being dispensed, a normally-open solenoid valve 50 is provided to direct the water in a recirculating manner through a check valve 52 and back to the beginning of fluid circuit 12 to be continuously recirculated by pump 30. Check valve 52 prevents backflow from inlet 14 and also provides any necessary back pressure for a manual valve (not shown) associated with the option remote dispensing gun 32.

Figure 2:
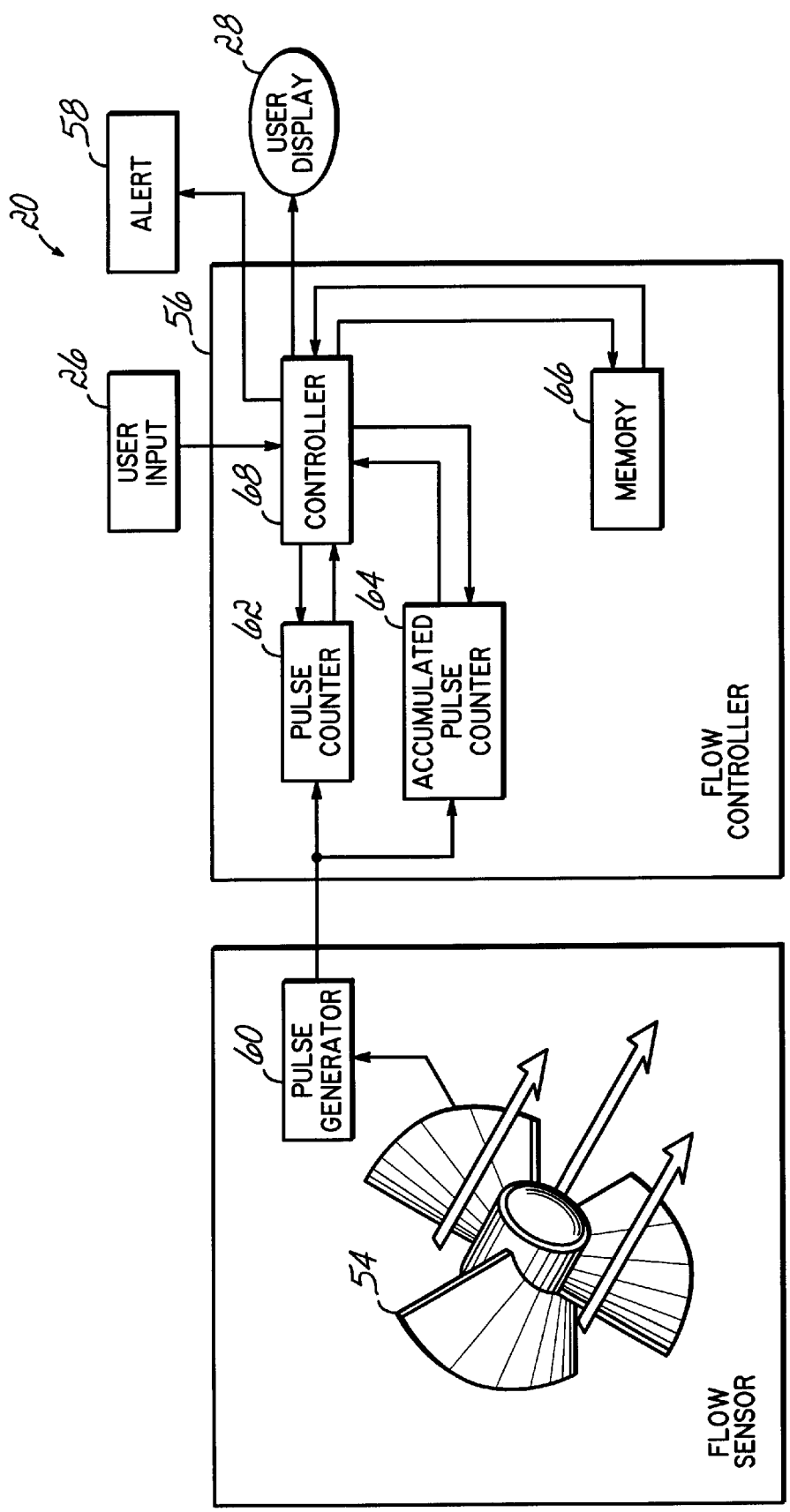
FIG. 2 is a block diagram of a flow control system for use in the water purification system of FIG. 1.

Flow control system 20 is the primary focus of the present invention and is illustrated according to a preferred embodiment in FIG. 2. In accordance with one aspect of the present invention, flow control system 20 includes a vane-type flow sensor 54 that is coupled to a flow controller 56 of the flow control system 20. Flow sensor 54 is operable to generate a signal that is used by the flow controller 56 to determine a volume of water dispensed from the water outlet 16. The flow controller 56 provides an output that is responsive to the signal generated by the flow sensor 54 for indicating the volume of water dispensed from the outlet 16.

The flow control system 20 of the present invention is provided to allow a user to input a desired volume of water to be dispensed at the outlet 16, and also to determine the volume of water dispensed from the water purification system 10. The user input 26 of the user interface 24 (FIG. 1) is preferably in the form of a control panel (not shown) that permits the user to simply enter the desired volume of purified water to be dispensed through outlet 16. The user display 28 of user interface 24 (FIG. 1) is preferably in the form of an LCD or similar display that provides a user-readable indication of the volume of purified water dispensed, or to be dispensed, by the water purification system 10. An optional alert 58 may be associated with the flow controller 56 to provide a visual and/or audible indication to the user when the desired volume of purified water has been dispensed.

In accordance with one aspect of the present invention as shown in FIG. 2, the flow sensor 54 includes a pulse generator 60 that is operable to generate a predetermined number of pulses in response to a predetermined volume of water dispensed through outlet 16, such as 6,900 pulses for every liter of purified water dispensed through the outlet 16. The flow controller 56 includes a pulse counter 62, accumulated pulse counter 64 and memory 66 coupled to a microcontroller 68 for monitoring and controlling the volume of purified water dispensed through outlet 16. It will be appreciated that while flow sensor 54 and flow controller 56 are illustrated as separate components, they may be combined into a single device without departing from the spirit and scope of the present invention.

Operation of the water purification system 10, including the flow sensor 54 and flow controller 56, will now be described in connection with monitoring and controlling the volume of purified water dispensed through outlet 16. Flow controller 56 is operable to run the software routines of FIGS. 3–6 to perform the following functions: 1) automatically dispense a predetermined volume of water corresponding to a desired volume of water input into the flow controller 52 by the user through the user input 26; 2) monitor the volume and total volume of purified water dispensed by the water purification system 10; 3) calibrate the water purification system 10 to automatically dispense the desired volume of water input by the user; and 4) perform a system check to identify the presence of the remote dispense gun 32 or a leak in the system 10. Those skilled in the art will appreciate that the software may reside in the memory 66 of the flow controller 56 and/or on tape, disc or diskette associated with the flow controller 56, although the location of the software is not limited to the flow controller 56 as will be appreciated by those of ordinary skill in the art.

Referring now to FIG. 3, the "AUTOMATIC DISPENSE ROUTINE" 70 will now be described. The purpose of this routine is primarily to permit a user to input a desired volume of water to be dispensed by the water purification system 10, and to control the system 10 to dispense the desired volume of water input by the user. Another purpose of this routine is to provide a user-readable display of the volume of water remaining to be dispensed through the outlet 16. At step 72, the flow controller 56 receives, through the user input 26, the volume of water desired by the user to be dispensed through outlet 16. At step 74, the flow controller 56 calculates a pulse count corresponding to the desired volume of water, and sets the calculated pulse count in the memory 66. For example, if the user desires one liter of purified water to be dispensed through the outlet 16, the flow controller sets a pulse count value of 6,900 in the memory 66. A determination is made at step 76 whether the user has pressed the "dispense key" to initiate automatic dispensing of the desired volume of purified water. If the "dispense key" has been pressed, the flow controller 56 resets the pulse counter 62 to zero at step 78 and sets the pump 30 to operate at "full speed" at step 80. At step 82, the flow controller 56 opens the normally-closed solenoid valve 46 associated with the dispense manifold 44 to dispense purified water through the water outlet 16. As water is dispensed at the outlet 16, flow sensor 54 is generating pulses through pulse generator 60 corresponding to the volume of water being dispensed. At step 84, the pulse counter 62 of the flow controller 56 is counting the pulses generated by the pulse generator 60 of the flow sensor 54. A decision is made at step 86 whether the pulse count generated by the pulse generator 60 equals the pulse count set in memory 66. If not, the pulse counter 62 continues to count the pulses generated by the pulse generator 60. However, if the generated pulse count does equal the pulse count set in memory 66, the flow controller 56 closes the solenoid valve 46 at step 88 to stop discharge of water through the outlet 16, and resets the pump 30 to its "recirculation speed" at step 90.

Further referring to FIG. 3, as the pulse counter 62 is counting pulses generated by the pulse generator 60, the flow controller 56 subtracts the present pulse count from the pulse count set in memory 66 and converts the pulse count remainder to a volume of water remaining to be dispensed, as indicated at step 92. The flow controller 56 provides a display of the volume of water remaining to be dispensed on the user display 28, as indicated at step 94. While not shown, it will be appreciated by those of ordinary skill in the art that the flow controller 56 could convert the present pulse count to a volume of water actually dispensed, and display that information to the user as well on the user display 28. When the desired volume of purified water has been dispensed, the flow controller 56 will actuate alert 58 to provide an indication to the user that the dispense cycle is completed. It will be appreciated that the "AUTOMATIC DISPENSE ROUTINE" 70 permits the user simply to input a desired volume of water to be dispensed, and thereafter accurately controls the dispensed volume of water to correspond to the desired volume input by the user.

With reference now to FIG. 4, the "TOTAL VOLUME DISPENSED ROUTINE" 95 will be described. The purpose of this routine is to monitor the total volume of purified water dispensed by the water purification system 10, and to provide this information to the user for various service, billing, warranty and usage-type purposes. In particular, at step 96, a volume of purified water is dispensed through the outlet 16. At step 98, the pulse generator 60 associated with the flow sensor 54 generates a series of pulses that are counted by the pulse counter 62, as well as by the accumulated pulse counter 64, of the flow controller 56. At step 100, the accumulated pulse counter 64 stores and accumulates the pulses generated by the pulse generator 60 over multiple dispensing operations of the water purification system 10. At step 102, the flow controller 56 converts the accumulated pulses counted by the accumulated pulse counter 64 to a total volume of purified water dispensed by the water purification system 10. As indicated at 104, this information may be used as service information to inform the user when service or maintenance of the system 10 is required. The service or maintenance may include changing the filter assembly 36 or injecting a sanitant into the fluid circuit 12 through the sanitization port 40, for example. As indicated at 106, the total volume of water dispensed by the water purification system 10 may also be used for billing information so that the user may be accurately charged for the volume of purified water dispensed by the system 10. As indicated at 108, this information may also be used for warranty information or, as indicated at 110, for usage-type information, such as the total volume of water that has been dispensed through the a particular water purification system 10 over a predetermined period of time.

Figure 5:
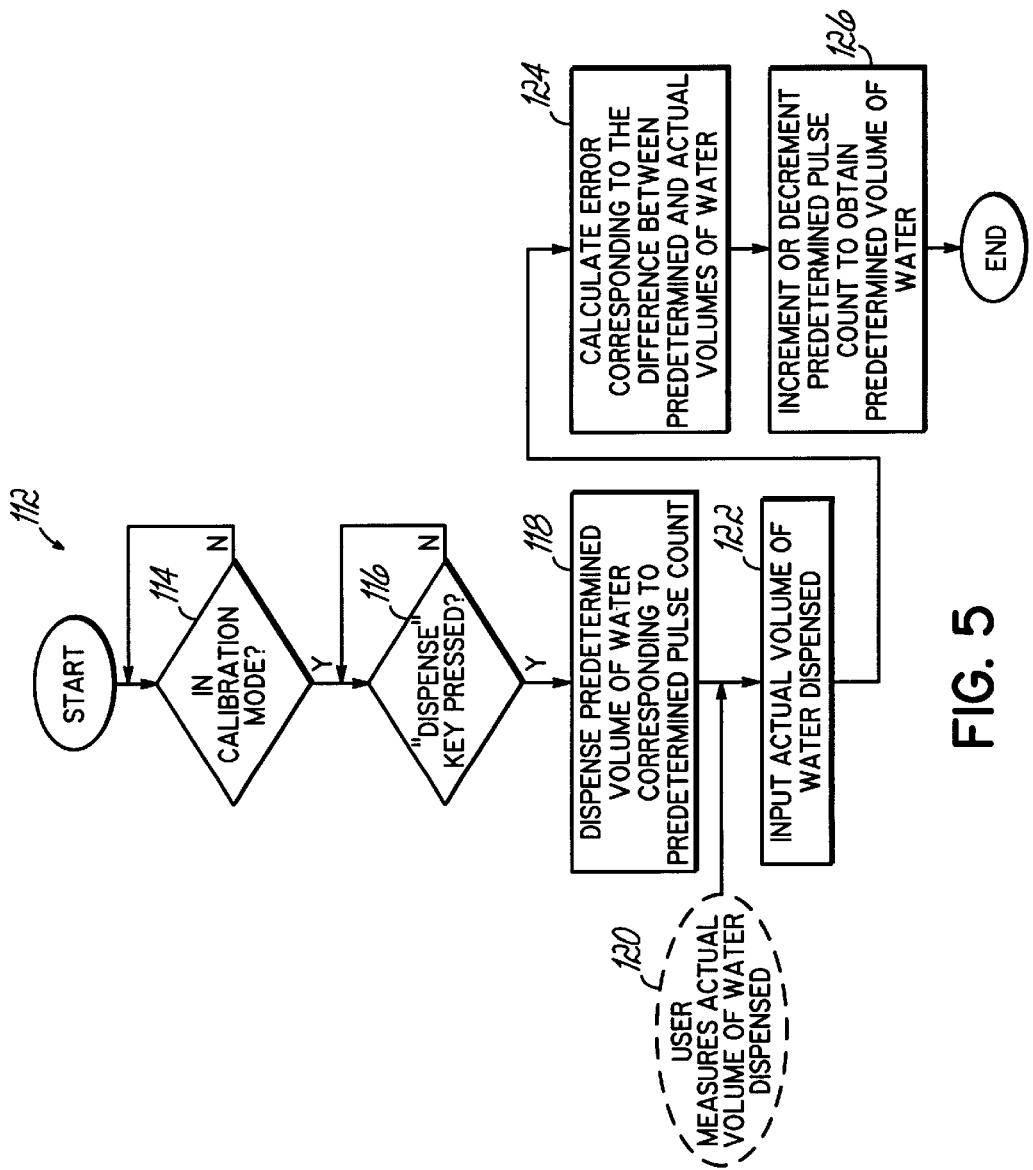
FIG. 5 is a software flow diagram of the "CALIBRATION ROUTINE" performed by the flow control system of the present invention.

Referring now to FIG. 5, the "CALIBRATION ROUTINE" 112 will now be described. The purpose of this routine is to calibrate the water purification system 10 to accurately dispense the desired volume of purified water at the outlet 16. At step 114, a determination is made whether the flow controller 56 has been set to operate in a "calibration mode". If yes, a determination is made at step 116 whether the user has depressed the "dispense key". If the user has depressed the "dispense key", the flow controller 56 dispenses a predetermined volume of purified water corresponding to a predetermined pulse count. For example, at step 118, if the flow controller 56 is set to operate in "calibration mode" and the "dispense key" has been pressed, the flow controller 56 may be programmed to dispense a liter of purified water corresponding to a pulse count of 6,900. As indicated at 120, the user measures the actual volume of water dispensed, and inputs that value into the flow controller 56 through the user input 26 at step 122. At step 124, the flow controller 56 calculates an error corresponding to the difference between the predetermined volume of water to be dispensed in "calibration mode" and the actual volume of water dispensed at the outlet 16. Thereafter, at step 126, the flow controller 56 increments or decrements the predetermined pulse count to obtain the predetermined volume of water that should be dispensed when the "dispense key" is pressed and the flow controller 56 is set to operate in "calibration mode". For example, it may be determined through the "CALIBRATION ROUTINE" 112 that one liter of dispensed purified water actually corresponds to a pulse count of 6,985 instead of 6,900. By calibrating the pulse count to correspond to the actual volume of water dispensed, all following automatic dispense cycles should be very accurate.

Figure 6:
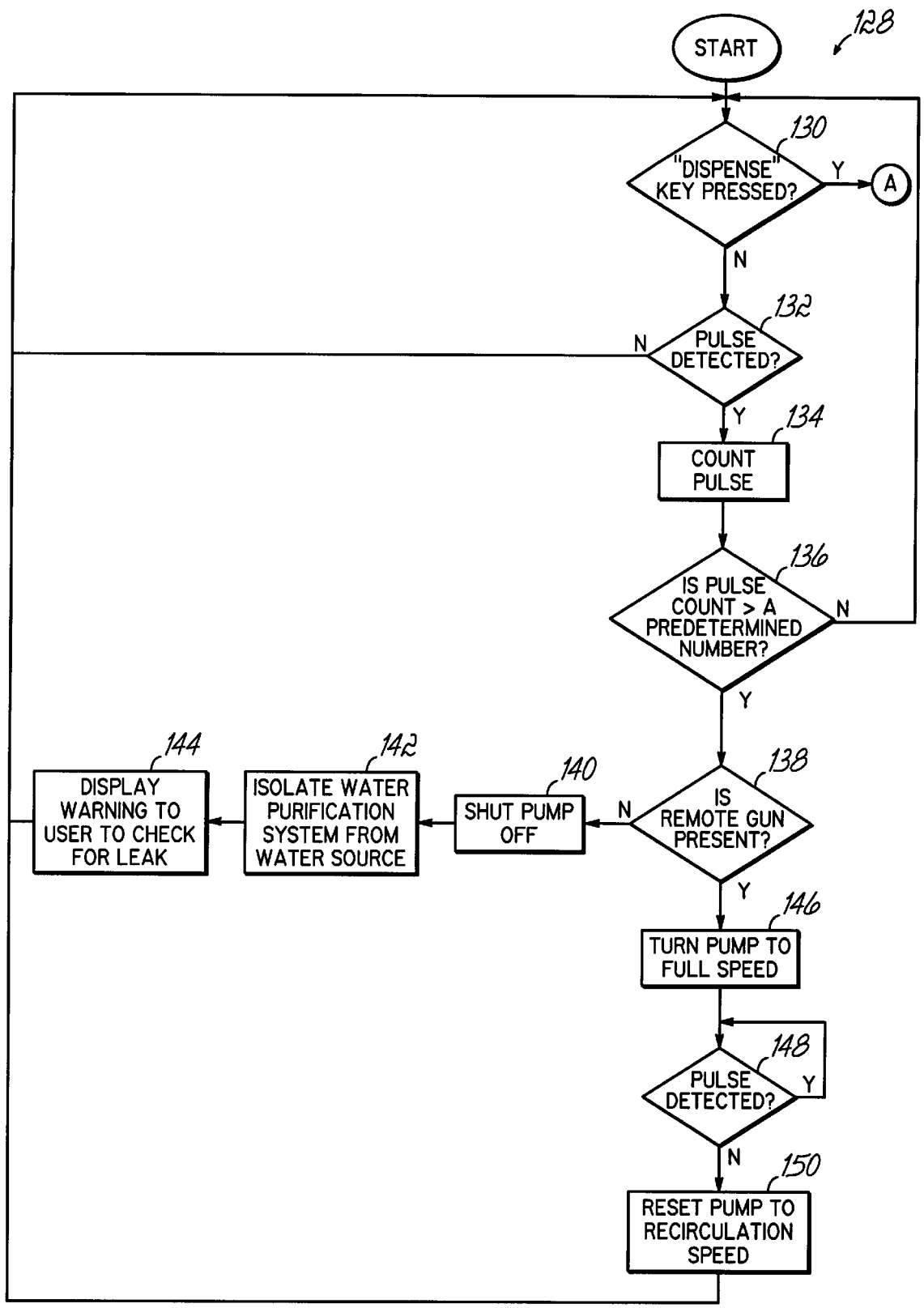
FIG. 6 is a software flow diagram of the "SYSTEM CHECK ROUTINE" performed by the flow control system of the present invention.

Referring now to FIG. 6, the "SYSTEM CHECK ROUTINE" 128 will now be described. The purpose of this routine is to determine either the connection of the remote gun 32 to the fluid circuit 12 or a leak in the system 10. At step 130, a determination is made whether the "dispense key" has been depressed. If yes, control is passed to the "AUTOMATIC DISPENSE ROUTINE" 70 as described above. If not, a determination is made at step 132 whether a pulse has been detected by the pulse counter 62 associated with the flow controller 56. If a pulse is detected at step 132, the pulse counter 62 counts the pulse at step 134. At step 136, the flow controller 56 determines whether the pulse count of pulse counter 62 is greater than a predetermined pulse number stored in memory 66. If the pulse count exceeds the predetermined pulse number stored in memory 66, a determination is made at step 138 whether the remote gun 32 is present. This information may be provided through a query of the user to verify that the remote gun 32 is or is not connected to the fluid circuit 12. If the user indicates at step 138 that the remote gun 32 is not present, flow controller 56 shuts off pump 30 at step 140, and may also cause the water purification system 10 to be disconnected from the water source (not shown) at step 142. Thereafter, the flow controller 56 may provide a display warning to the user on user display 28 to warn the user to check for a leak in the system 10 at step 144.

If a determination is made at step 138 that the remote gun 32 is connected to the fluid circuit 12, the flow controller 56 turns the pump 30 to "full speed" at step 146. A determination is made at step 148 whether a pulse is detected by the pulse counter 62, indicating that purified water is being dispensed through the remote gun 32. If no pulse is detected at step 148, indicating that the valve (not shown) of the remote gun 32 has been closed, the flow controller 56 resets the pump 30 to operate at its "recirculation speed" at step 150.

Figure 2A:
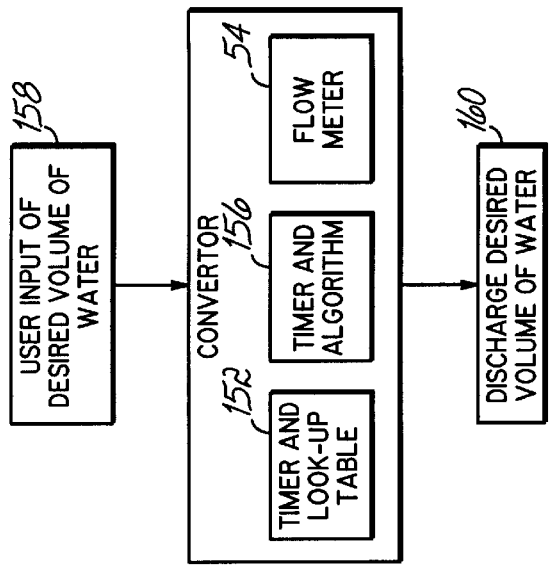
FIG. 2A is a diagrammatic representation of the flow control system of FIG. 2.

While a vane-type flow sensor 54 is shown in the preferred embodiment of FIG. 2, it will be appreciated that other sensing devices are possible without departing from the spirit and scope of the present invention. For example, the sensing device may have a voltage or current output rather than a pulse output as described in detail above. Moreover, while a vane-type flow sensor has been described in detail, it will be appreciated that the flow sensor may comprise an ultrasonic, paddlewheel or similar flow sensor readily known by those of ordinary skill in the art. Additionally, and as illustrated in FIG. 2A, the sensing device may include a timer and look-up table 152 or timer and algorithm 154 associated with the flow controller 56. For example, as indicated at 158 in FIG. 2A, the user may input a desired volume of purified water to be dispensed by system 10 through the user input 26. In the event the sensing device comprises a timer and look-up table 152, the flow controller 56 includes a look-up table that correlates a desired volume of purified water input by the user to a dispense time corresponding to opening of the normally-closed solenoid valve 46. In this embodiment, the user's input of the desired volume of purified water to be dispensed by the system 10 is converted by the sensing device 152 into a time value for opening the normally-closed solenoid valve 46. In this way, the water purification system 10 discharges a desired volume of purified water input by the user as indicated at 160.

Alternatively, when the sensing device is a timer and algorithm, the flow controller 56 converts the user's input of the desired volume of purified water to be dispensed into a time value for opening the normally-closed solenoid valve 46. The time value is computed in the algorithm by dividing the desired volume of purified water input by the user by the known flow rate of the system 10.

It will be appreciated by those of ordinary skill in art that while the flow control system 20 has been described as being positioned upstream of the inlet to the water purification device 34, the flow control system may alternatively be positioned downstream of the outlet of the water purification device 34 without departing from the spirit and the scope of the present invention.

While the present invention has been illustrated by a description of these preferred embodiments and while these embodiments have been described in some detail, it is not the intention of the Applicants to restrict or in any way limit the scope of the appended claims to such detail. Additional advantages and modifications will readily appear to those skilled in the art. This has been a description of the present invention, along with the preferred methods of practicing the present invention as currently known. Various aspects of this invention may be used alone or in different combinations. The scope of the invention itself should only be defined by the appended claims, wherein we claim:

What is claimed is:

1. A water purification system for purifying water flowing through a water flow path between an inlet and an outlet, the system comprising:

a water purification device in a water flow path having an outlet, said water purification device having at least one interior volume;

a purification medium positioned within the interior volume;

a pump for moving water through the purification medium;

a flow control system for controlling a volume of purified water dispensed from the outlet of the water flow path, the flow control system including an input device configured to allow a user to input a desired volume of purified water to be dispensed from the outlet of the water flow patch during a dispense cycle and a sensing device operable to generate a signal used to determine a volume of purified water dispensed from the outlet of the water flow path; and a flow regulation device coupled to the flow control system and operable to stop the discharge of purified water at the outlet of the water flow path when the desired volume of purified water has been dispensed from the outlet of the water flow path.

2. A water purification system for purifying water flowing through a water flow path between an inlet and an outlet, the system comprising:

a water purification device in a water flow path having an outlet, said water purification device having at least one interior volume;

a purification medium positioned within the interior volume;

an input device configured to allow a user to input a desired amount of water to be dispensed from the outlet of the water flow path during a dispense cycle;

a sensing device operable to generate a signal used to determine a volume of water dispensed from the outlet of the water flow path;

an electronic control coupled with the sensing device and having an output responsive to the signal for indicating the volume of the water dispensed from the outlet of the water flow path; and a display coupled to the electronic control and responsive to the output for displaying the volume of water dispensed from the outlet of the water flow path.

3. A water purification system for purifying water flowing through a water flow path between an inlet and an outlet, the system comprising:

a water purification device in a water flow path having an outlet, said water purification device having at least one interior volume;

a purification medium positioned within the interior volume;

a pump for moving water through the purification medium;

an input device configured to allow a user to input a desired amount of purified water to be dispensed from the outlet of the water flow path during a dispense cycle;

a sensing device configured to sense a fluid characteristic of the water flowing through the water flow path, the fluid characteristic being at least indirectly indicative of the volume of water flowing through the water flow path;

a flow regulation device coupled to the water flow path and configured to control the discharge of purified water from the outlet of the water flow path; and a control coupled to the input device, the sensing device, and the flow regulation device, the control operating to manipulate information generated by the input device and the sensing device to thereby control the flow regulation device to dispense the desired volume of purified water from the outlet of the water flow path.

4. A water purification system for purifying water flowing through a water flow path between an inlet and an outlet, the system comprising:

a water purification device in a water flow path having an outlet, said water purification device having at least one interior volume;

a purification medium positioned within the interior volume;

an input device configured to allow a user to input a desired volume of water to be dispensed from the outlet of the water flow path during a dispense cycle;

a sensing device operable to generate a signal used to determine a volume of water dispensed from the outlet of the water flow path;

an electronic control coupled with the sensing device and having an output responsive to the signal for indicating the volume of the water remaining to be dispensed from the outlet of the water flow path until the desired volume of water to be dispensed from the outlet of the water flow path is reached; and a display coupled to the electronic control and responsive to the output for displaying the volume of water remaining to be dispensed from the outlet of the water flow path until the desired volume of water to be dispensed from the water flow path is reached.

* * * * *

UNITED STATES PATENT AND TRADEMARK OFFICE
CERTIFICATE OF CORRECTION

PATENT NO. : 6,432,300 B2
DATED : August 13, 2002
INVENTOR(S) : Larkner et al.

It is certified that error appears in the above-identified patent and that said Letters Patent is hereby corrected as shown below:

Column 8,
Line 44, reads "water flow patch" and should read -- water flow path --.
Line 48, reads "coupled to the flow" and should read -- coupled with the flow --.
Line 63, reads "desired amount of water" and should read -- desired volume of water --.

Column 9,
Line 3, reads "of the water" and should read -- of water --.
Line 8, reads "purification system" and should read -- purification device --.
Line 20, reads "desired amount" and should read -- desired volume --.

Column 10,
Line 23, reads "volume of the water" and should read -- volume of water --.

Signed and Sealed this

Twelfth Day of August, 2003

JAMES E. ROGAN
*Director of the United States Patent and Trademark Office*